United States Patent
Ravgad et al.

(10) Patent No.: US 10,327,200 B2
(45) Date of Patent: Jun. 18, 2019

(54) COMMUNICATION NETWORK MANAGEMENT SYSTEM AND METHOD

(71) Applicant: Intel Corporation, Santa Clara, CA (US)

(72) Inventors: Segev Ravgad, Tel Aviv (IL); Roni Abiri, Raanana (IL)

(73) Assignee: Intel Corporation, Santa Clara, CA (US)

( * ) Notice: Subject to any disclaimer, the term of this patent is extended or adjusted under 35 U.S.C. 154(b) by 119 days.

(21) Appl. No.: 15/278,473

(22) Filed: Sep. 28, 2016

(65) Prior Publication Data

US 2018/0092031 A1 Mar. 29, 2018

(51) Int. Cl.

| | |
|---|---|
| *H04W 48/18* | (2009.01) |
| *H04W 24/08* | (2009.01) |
| *H04B 17/309* | (2015.01) |
| *H04W 48/20* | (2009.01) |
| *H04B 17/318* | (2015.01) |

(52) U.S. Cl.
CPC .......... *H04W 48/18* (2013.01); *H04B 17/309* (2015.01); *H04W 24/08* (2013.01); *H04W 48/20* (2013.01); *H04B 17/318* (2015.01)

(58) Field of Classification Search
CPC ..... H04W 48/18; H04W 24/08; H04B 17/309
USPC .......................................................... 370/252
See application file for complete search history.

(56) References Cited

U.S. PATENT DOCUMENTS

| | | | | |
|---|---|---|---|---|
| 5,432,843 A * | 7/1995 | Bonta | ................... | H04W 36/12 455/437 |
| 6,952,395 B1 * | 10/2005 | Manoharan | ......... | H04J 14/0227 14/227 |
| 2004/0147262 A1 * | 7/2004 | Lescuyer | .......... | H04W 36/0083 455/434 |
| 2006/0026575 A1 | 2/2006 | Cabillic et al. | | |
| 2010/0135178 A1 | 6/2010 | Aggarwal et al. | | |
| 2010/0214939 A1 * | 8/2010 | Ryan | ..................... | H04W 24/08 370/252 |
| 2012/0021744 A1 * | 1/2012 | Chin | ..................... | H04L 1/0029 455/436 |
| 2015/0141018 A1 | 5/2015 | Kapoulas et al. | | |

(Continued)

FOREIGN PATENT DOCUMENTS

WO    WO-2016/011011 A1    1/2016

OTHER PUBLICATIONS

Search Report dated Oct. 12, 2017 for International Application No. PCT/US17/047606.

*Primary Examiner* — Chi Tang P Cheng
(74) *Attorney, Agent, or Firm* — Schiff Hardin LLP

(57) ABSTRACT

A communication manager of a communication network can include a transceiver configured to communicate with communication stations and one or more clients of the communication network, and a controller. The controller can be configured to: generate a management packet and provide, using the transceiver, the management packet to the communication stations to control the communication stations to monitor a communication from the client of the one or more clients and measure the client communication; obtain respective measurements from the communication stations using the transceiver; and control the client of the one or more clients to select a communication station from the communication stations to serve the client based on the respective measurements.

26 Claims, 5 Drawing Sheets

(56) References Cited

U.S. PATENT DOCUMENTS

2016/0021580 A1    1/2016  Mufti
2017/0272186 A1*  9/2017  Yang .................... H04W 16/14

\* cited by examiner

COMMUNICATION NETWORK MANAGEMENT SYSTEM AND METHOD

BACKGROUND

Field

Aspects described herein generally relate to communication system management, including central management of network clients.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1:
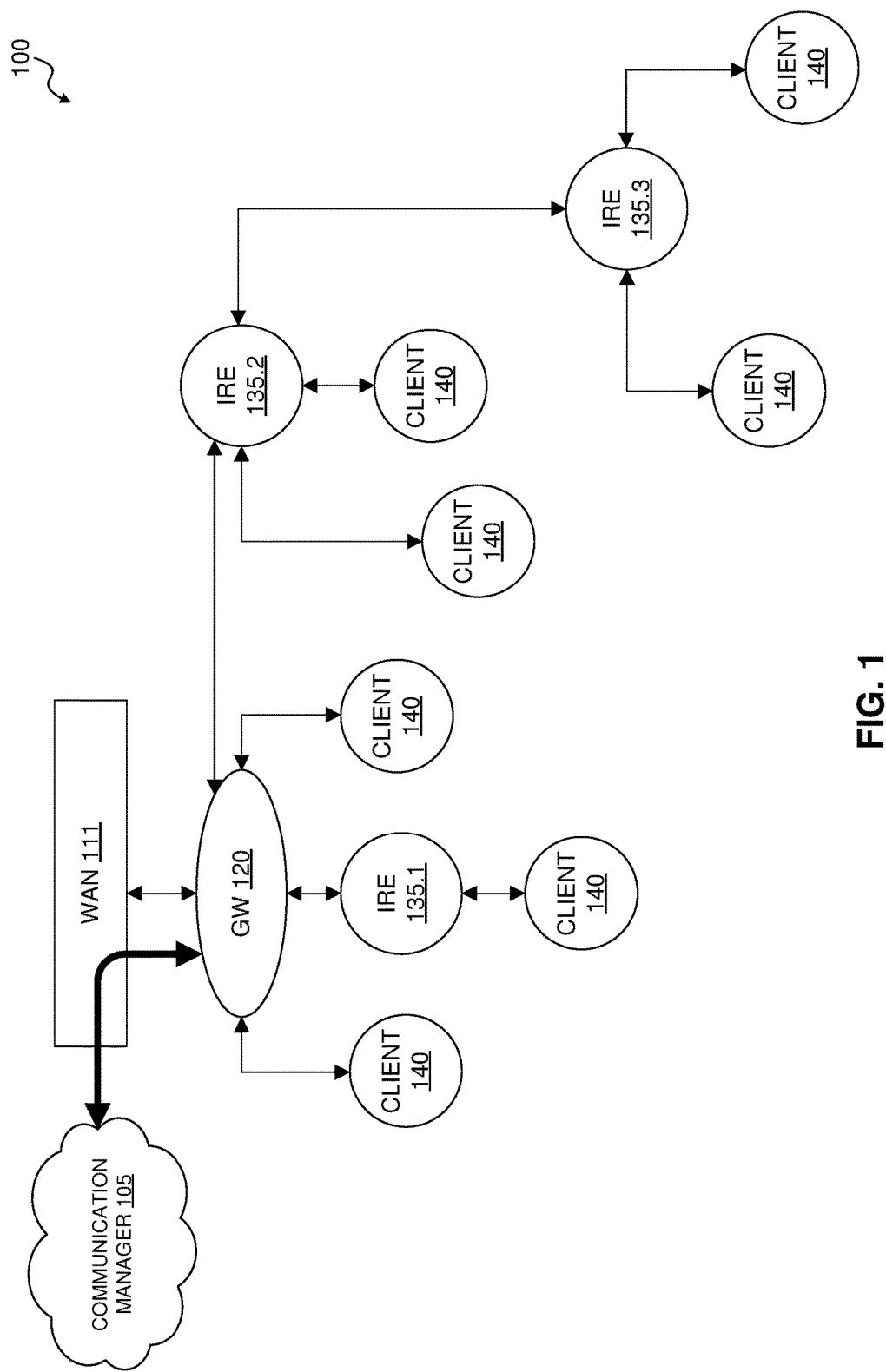
FIG. 1 illustrates a communication network management system according to an exemplary aspect of the present disclosure.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

As an overview, wireless client devices such as clients, stations, or mobile devices can be configured to perform one or more measurements for one or more wireless characteristics. Based on the measurement(s), the wireless client device can determine an appropriate access point (or other serving device) based on the measurements.

In exemplary aspects of the present disclosure, a wireless communication system can include a communication manager that is configured to manage and control which gateway (GW), or intelligent range extenders (IRE) is to serve one or more wireless clients of the wireless communication system. The gateway (GW) can also be referred to as an access point (AP). The communication manager can be configured to perform a centralized management and optimization of some or all nodes (GW, IRE) including the communication backhaul. The communication manager can be configured to perform real-time mobility management and/or load balancing of the wireless clients based on a global (complete) analysis of the wireless communication system. The communication manager can utilize multiple frequency bands (e.g., 2.4 GHz, 5 GHz) for backhaul and service of clients.

In an exemplary aspect, the communication manager can be configured to receive measurement information from one or more clients, one or more access points (gateway) and/or one or more IREs and provide management packets to the access points (gateway) and the IREs. The communication manager can use a secured in-band signaling protocol between the access points (gateway) and the IREs to exchange the measurement information and management packets.

In addition to the AP or IRE serving the wireless client, the communication manager can be configured to control one or more (e.g., all) other APs and IREs to measure wireless characteristics (e.g., path loss) between the wireless client and/or obtain wireless characteristics (e.g., path loss/signal strength measurements) from the wireless client. Using the signaling protocol, the communication manager can control the AP/IRE to instruct the wireless client to transmit (so as to measure the path loss, signal strength, etc.) and instruct one or more other APs and/or IREs to listen for the transmission from the wireless client to also measure the path loss, signal strength, etc. In an exemplary aspect, the communication manager and the APs and/or IREs of the communication system can use request-to-send (RTS)/Clear-to-send (CTS) flow control procedures.

For example, the measurement of wireless characteristics (e.g., path loss, signal strength, etc.) can be obtained not only by the serving AP/IRE but also by all other APs/REs in the communication system. In an exemplary aspect, this is carried by sending a time synchronized management packet from the serving AP/IRE to each device being served, and setting all other stations (other APs/IREs) to listen for the respective transmissions of the served device(s). In this example, all AP/IREs can be time synchronized, move to the channel the client uses to measure the path loss. The AP/IRE can operate in a dedicated listen only mode where no beacons are transmitted. This operation can be coupled with the RF subsystem of the IRE to support switching of the scanned channel from the served one to the scanned one (e.g., to enable concurrent 5 GHz operation and a scanning mode).

FIG. 1 illustrates a communication network management system 100 according to an exemplary aspect of the present disclosure.

The system 100 can include a communication manager 105, a wide-area network (WAN) 111, one or more gateways (GW) 120 (also referred to as access points (APs)), one or more intelligent range extenders (IRE) 135, and one or more clients 140. Clients 140 can also be referred to as stations or mobile devices. In exemplary aspects, the components of the system 100 can operation based on a master-slave relationship. For example, the IRE 135.3 can be a slave to the IRE 135.2. The IRE 135.2 can also be a slave to the GW 120 operating as a master. Further, the communication manager 105 can be a master to all components of the system 100 in one or more exemplary aspects.

Examples of a client include (but are not limited to) a mobile computing device—such as a laptop computer, a tablet computer, a mobile telephone or smartphone, a "phablet," a personal digital assistant (PDA), and mobile media player; Internet-of-Things (IOT) devices, and a wearable computing device—such as a computerized wrist watch or "smart" watch, and computerized eyeglasses. In some aspects of the present disclosure, the client 140 may be a stationary communication device, including, for example, a stationary computing device—such as a personal computer (PC), a desktop computer, a computerized kiosk, and an automotive/aeronautical/maritime in-dash computer terminal.

As illustrated in FIG. 1, the communication manager 105 can be implemented within the backhaul network and connected to the GW 120, IREs 135 and clients 140 via the WAN 111. In this example, the communication manger 105 can be, for example, hosted within the backhaul network as a cloud computing device. The GW 120 (or AP) and the IRE 135 can each be generally referred to as a communication station.

In an exemplary aspect, the communication manager 105 is instead implemented within the WAN 111, the gateway 120, or an IRE 135. For example, the communication manager 105 can be implemented in a single component of the system 100, such as in the gateway 120 or as a component of the backhaul network of the WAN 111.

In an alternative exemplary aspect, the communication manager 105 is a distributed device and is included in multiple components across the system 100 but configured to function as a single communication manager. For example, the processing performed by the communication manager 105 can be distributed among two or more of the components of the system 100.

In an exemplary aspect, the backhaul communication network (and in some aspects, the WAN 111) can include one or more well-known communication components—such as one or more network switches, one or more network gateways, and/or one or more servers. The backhaul communication network can include one or more devices and/or components configured to exchange data with one or more other devices and/or components via one or more wired and/or wireless communications protocols.

In exemplary aspects, the gateway 120, IREs 135, and clients 140 communicate with one or more service providers via the WAN 111 and the backhaul communication network. In an exemplary aspect, the backhaul communication network is an internet protocol (IP) backhaul network, but is not limited thereto. The number of gateways 120, IREs 135, and clients 140 are not limited to the quantities illustrated in FIG. 1, and the system 100 can include any number of the various components as would be understood by one of ordinary skill in the relevant art(s). For example, the system 100 can include another GW 120 connected to the WAN 111 and that serves one or more other IREs 135 and/or clients 140.

The GWs 120, IREs 135, and clients 140 can each include one or more transceivers configured to transmit and/or receive communications via one or more wireless and/or wired technologies within the communication system 100. In an exemplary aspect, the GWs 120, IREs 135 and clients 140 are configured to wireless communicate using one or more protocols defined in Institute of Electrical and Electronics Engineers' (IEEE) 802.11 specification, such as IEEE 802.11ac, but is not limited thereto. The GWs 120, IREs 135 and clients 140 can be configured to communicate using one or more frequency bands, including, for example, 2.4 GHz and 5 GHz. The GWs 120, IREs 135 and clients 140 can additionally or alternatively be configured to communicate using one or more wired communication technologies, such as Ethernet (IEEE 802.3), Power-line communications (PLC), Multimedia over Coax Alliance (MoCA), and/or fiber optic, but is not limited thereto. For example, an IRE 135 can communicate with the GW 120 or another IRE 135 via one or more wired or other wireless communication protocols while wirelessly serving one or more clients 140. That is, the backhaul of the IRE 135 can be wired (or wireless) while the serving side is wireless. Alternatively, both the backhaul and the serving side can be wireless for example.

Figure 2:
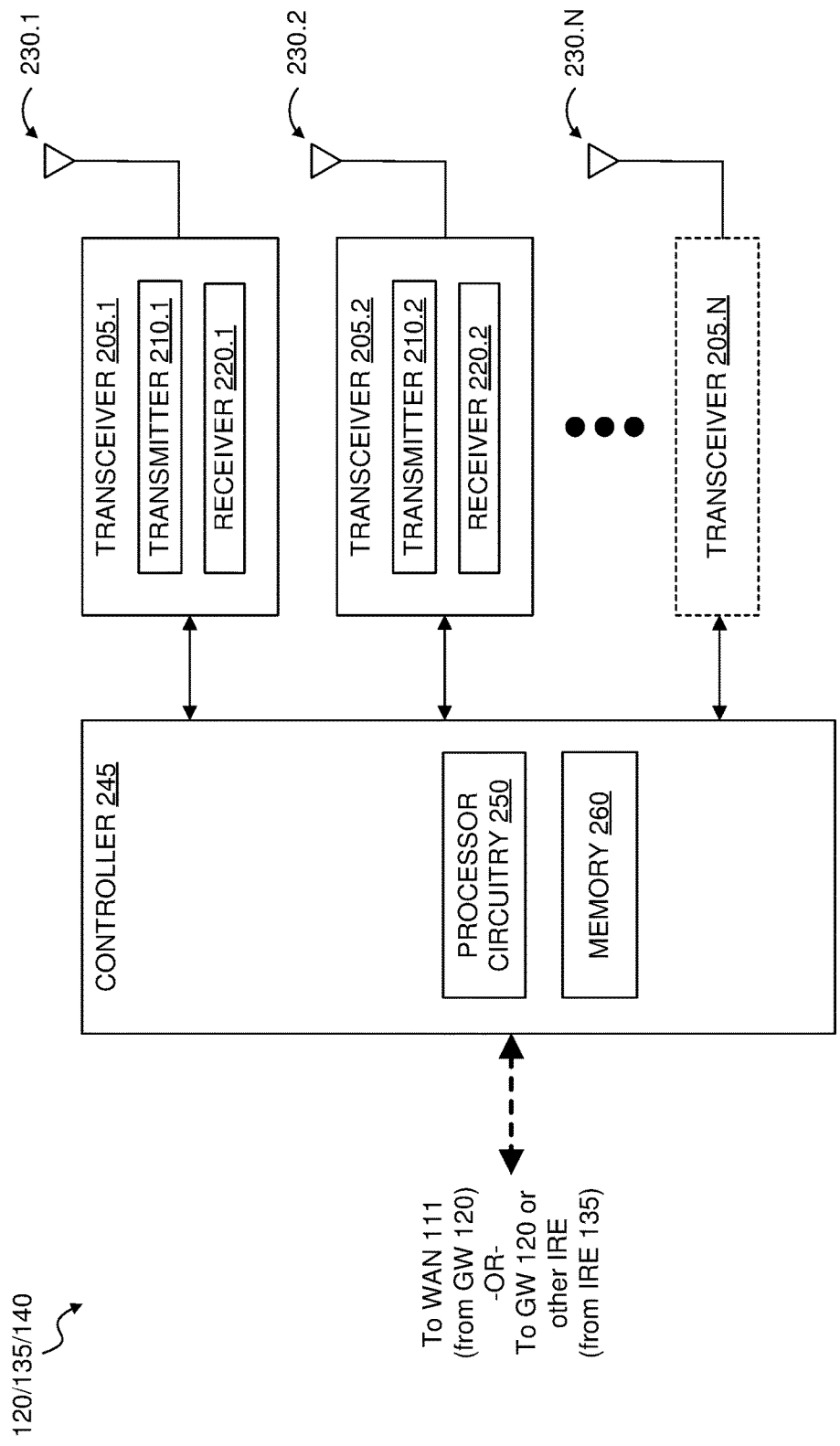
FIG. 2 illustrates exemplary aspects of a gateway, client, and/or range extender.

FIG. 2 illustrates a communication device 200 according to an exemplary aspects of the present disclosure. The communication device 200 can represent exemplary aspects of the GW 120, IRE 135, and/or client 140. In an exemplary aspect, the communication device 200 can also represent the WAN 111.

In an exemplary aspect, the communication device 200 is configured to transmit and/or receive wireless and/or wired communications via one or more wireless and/or wired technologies. For example, the communication device 200 can be configured for wireless communications conforming to the IEEE 802.11 specification, but is not limited thereto.

The communication device 200 can be configured to communicate with one or more other communication devices. For example, as illustrated in FIG. 1, an IRE 135 can communicate with one or more other IREs 135 and/or the GW 120.

The communication device 200 can include a controller 245 communicatively coupled to one or more transceivers 205. The transceiver(s) 205 can be configured to transmit and/or receive wireless and/or wired communications via one or more wireless and/or wired technologies. The transceiver 205 can include processor circuitry that is configured for transmitting and/or receiving wireless and/or wired communications conforming to one or more wireless and/or wired protocols. For example, the transceiver 205 can include a transmitter 210 and a receiver 220 configured for transmitting and receiving wireless communications, respectively, via one or more antennas 230. The transmitter 210 and receiver 220 can additionally or alternatively be configured for wired communications.

In an exemplary aspect, one or more of the transceivers 205 is an IEEE 802.11 transceiver configured to wireless communicate using a protocol defined in the IEEE 802.11 standard, such as IEEE 802.11ac, but is not limited thereto. In an exemplary aspect, a first set of one or more of the transceivers 205 can be configured to operate a first frequency band and a second set of one or more of the transceivers 205 can be configured to operate a second frequency band different from the first frequency band. In a non-limited example, the transceiver 205.1 can operate at 2.4 GHz while the transceiver 205.2 operates at 5 GHz. In an exemplary aspect, the transceivers 205 may operate in the same channel or in adjacent channels. In an exemplary aspect, the transceivers 205 operate in the same channel or in adjacent channels, but not concurrently.

In an exemplary aspect, one or more of the transceivers 205 can operate as serving transceiver configured to communicate (e.g., serve) one or more clients 140, while one or more other transceivers 205 can operate as a backhaul transceiver communicating with one or more higher level components of the system 100, such as another IRE 135, GW 120, or WAN 111.

In exemplary aspects, the transceiver(s) 205 can include (but is not limited to) a digital signal processor (DSP), modulator and/or demodulator, a digital-to-analog converter (DAC) and/or an analog-to-digital converter (ADC), an encoder/decoder (e.g., encoders/decoders having convolution, tail-biting convolution, turbo, Viterbi, and/or Low Density Parity Check (LDPC) encoder/decoder functionality), a frequency converter (including mixers, local oscillators, and filters), Fast-Fourier Transform (FFT), precoder, and/or constellation mapper/de-mapper that can be utilized in transmitting and/or receiving of wireless communications. Further, those skilled in the relevant art(s) will recognize that antenna 230 may include an integer array of antennas, and that the antennas may be capable of both transmitting and receiving wireless communication signals. In aspects having two or more transceivers 205, the two or more transceivers 205 can have their own antenna 230, or can share a common antenna via a duplexer.

The controller 245 can include processor circuitry 250 that is configured to control the overall operation of the communication device 200, such as the operation of the transceiver(s) 205. The processor circuitry 250 can be configured to control the transmitting and/or receiving of wireless/wired communications via the transceiver(s) 205, and/or perform one or more baseband processing functions (e.g., media access control (MAC), encoding/decoding, modulation/demodulation, data symbol mapping; error correction, etc.). The processor circuitry 250 can be configured to run one or more applications and/or operating systems; power management (e.g., battery control and monitoring); display settings; volume control; and/or user interactions via one or more user interfaces (e.g., keyboard, touchscreen display, microphone, speaker, etc.). In an exemplary aspect, the controller 245 can include one or more elements of a protocol stack such as, a physical (PHY) layer, media access control (MAC), radio link control (RLC), packet data convergence protocol (PDCP), and/or radio resource control (RRC) elements.

In an exemplary aspect, the controller 245 is configured to control the communication device 200 to perform one or more communication management operations in exemplary aspects when the communication device 200 (as a GW 120, IRE 135) includes the communication manager 105. As described above and in more detail below, the communication manager 105 can be implemented within, for example, the gateway 120 or one of the IREs 135. The communication manager operations can include the management and control of which GW 120 and/or IRE 135 is to serve a particular wireless client 140 of the wireless communication system 100. In operation, the communication manager 105 can be configured to perform a centralized management and optimization of the nodes (e.g., GWs 120, IREs 135).

The controller 245 can further include a memory 260 that stores data and/or instructions, where when the instructions are executed by the processor circuitry 250, controls the processor circuitry 250 to perform the functions described herein. In an exemplary aspect, the memory 206 can store measurement information obtained from one or more measurements, such as a measuring of path loss, received signal strength indicator (RSSI), and/or one or more other signal characteristics as would be understood by one of ordinary skill in the art.

The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

In one or more exemplary aspects where the communication device 200 represents a gateway 120 or IRE 135, the communication device 200 can be configured to communicate with one or more clients 140. An IRE configured communication device 200 can be configured to communicate with the gateway 120, one or more other IREs 135 and/or one or more clients 140 to extend the range of the gateway(s) 120. In this example, the communication device 200 can configure at least one transceiver to operate as a backhaul transceiver to communicate with the gateway 120 (and one or more intervening IREs 135) and configured at least one other transceiver as a serving transceiver to serve one or more clients 140 and/or one or more other downstream IREs 135. In some aspects, a single transceiver can be used and multiplexed between backhaul and serving functions.

In an exemplary operation, the GW 120 and/or IRE 135 implemented communication device 200 can be configured to instruct one or more served clients 140 to perform a measurement operation. For example, the communication device 200 can transmit a measurement packet to one or more clients 140 based on a management packet received from the communication manager 105. The management packet instructs the communication device 200 to listen for and measure a transmission from the client(s) 140. The management packet can be configured to trigger the generation and transmission (by the GW 120 and/or IRE 135) of a signal (e.g., measurement packet) to the client 140. In response, the client 140 will generate and transmit a signal that will be listened for and subject to measurement by the communication device 200 (the GW 120 and/or IRE 135). This operation is described in more detail with reference to FIG. 4 below.

In one or more exemplary aspects where the communication device 200 represents a client 140, the communication device 200 can be configured to communicate with the gateway 120 directly and/or via one or more IREs 135. In operation, as described with more detail below with reference to FIG. 4, the communication device 200 can be configured to generate and transmit a signal in response to a measurement packet from the GW 120 or IRE serving the communication device 200. This signal is then measured by the GWs 120 and IREs 135 of the communication system 100 to measure signal characteristics associated with the communication device 200.

Figure 3:
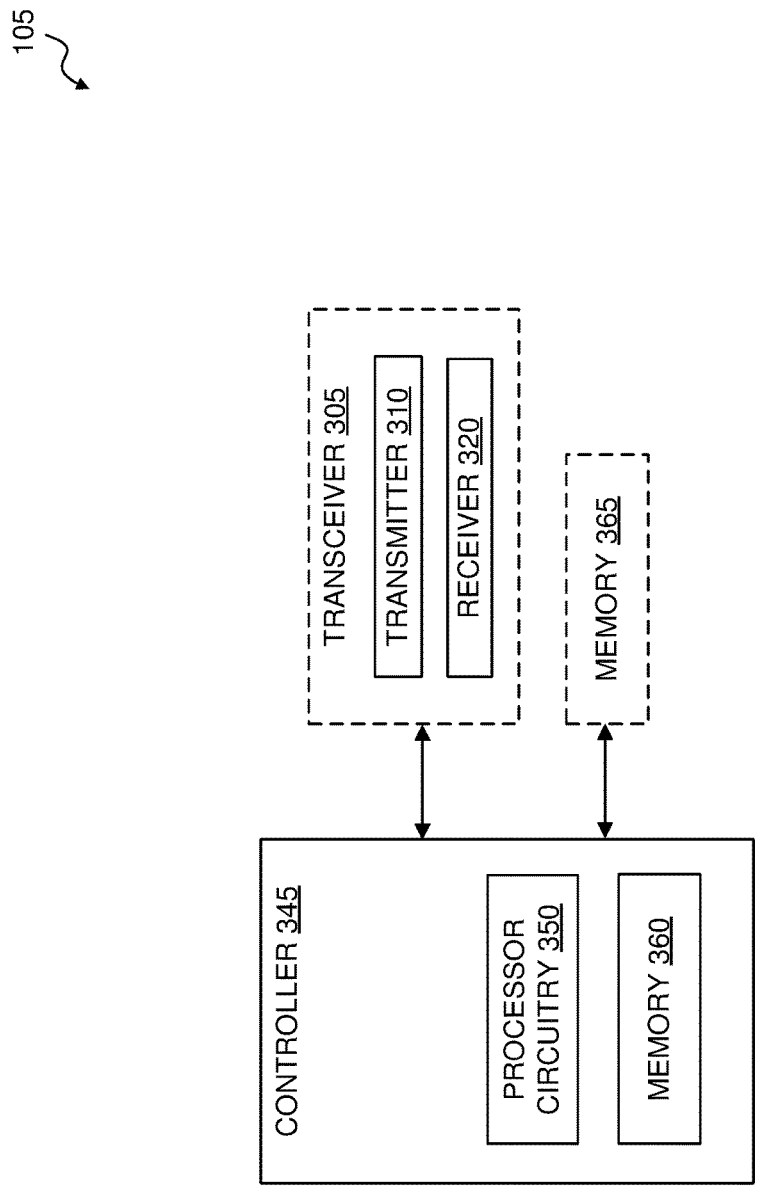
FIG. 3 illustrates a communication manager according to an exemplary aspect of the present disclosure.

FIG. 3 illustrates a communication manager 105 according to an exemplary aspect of the present disclosure. The communication manager 105 can be configured to manage and control which of the GWs 120 and/or IREs 135 is to serve a particular wireless client 140 of the wireless communication system 100. In operation, the communication manager 105 can be configured to perform a centralized management and optimization of the nodes (e.g., GWs 120, IREs 135). In an exemplary aspect, communication manager 105 can be configured to communicate with the WAN 111, GW 120, IREs 135 and/or clients 140 using a secure in-band signaling protocol to exchange measurement information and management packets.

The communication manager 105 can include a controller 345. In an exemplary aspect, the communication manager can also include one or more transceivers 305 and/or one or more external memories 365 communicatively coupled to the controller 345. As described above, the communication manager 365 can be implemented within the backhaul network and connected with the GW 120, IREs 135 and clients 140 via the WAN 111. In these aspects, the communication manager 105 can include the transceiver(s) 305 to communicate with the GW 120, IREs 135 and/or clients 140.

In other aspects, the communication manager 105 can instead be implemented within the WAN 111, the gateway 120, and/or an IRE 135. For example, the communication manager 105 can be implemented in a single component of the system 100, such as in the gateway 120 or as a component of the backhaul network of the WAN 111. In an alternative exemplary aspect, the communication manager 105 is a distributed device and is included in multiple components across the system 100 but configured to function as a single communication manager. In these exemplary aspects, the communication manager 105 does not require its own transceiver 305 and can use one or more transceivers of the hosting WAN 111, the gateway 120, and/or an IRE 135. However, the communication manager 105 can include one or more transceivers 305 even when hosted within another component.

In exemplary aspects where the communication manager includes one or more transceivers 305, the processor circuitry 250 can be configured to control the operation of the transceiver(s) 305. The processor circuitry 350 can be configured to control the transmitting and/or receiving of wireless/wired communications via the transceiver(s) 305, and/or perform one or more baseband processing functions (e.g., media access control (MAC), encoding/decoding, modulation/demodulation, data symbol mapping; error correction, etc.). The processor circuitry 350 can be configured to run one or more applications and/or operating systems; power management (e.g., battery control and monitoring); display settings; volume control; and/or user interactions via one or more user interfaces (e.g., keyboard, touchscreen display, microphone, speaker, etc.). In an exemplary aspect, the controller 345 can include one or more elements of a protocol stack such as, a physical (PHY) layer, media access control (MAC), radio link control (RLC), packet data convergence protocol (PDCP), and/or radio resource control (RRC) elements.

The transceiver(s) 305 can be configured to transmit and/or receive wireless and/or wired communications via one or more wireless and/or wired technologies. The transceiver 305 can include processor circuitry that is configured for transmitting and/or receiving wireless and/or wired communications conforming to one or more wireless and/or wired protocols. For example, the transceiver 305 can include a transmitter 310 and a receiver 320 configured for transmitting and receiving wireless communications, respectively, via one or more antennas 330. The transmitter 310 and receiver 320 can additionally or alternatively be configured for wired communications.

The controller 345 can include processor circuity 350 that is configured to control the overall operation of the communication manager 105. For example, the processor circuitry 350 can be configured to perform one or more communication management operations to obtain measurement information associated with one or more clients 140 of the communication system 100. Based on the measurement information, the controller 345 can manage and control which of the GWs 120 and/or IREs 135 is to serve a particular wireless client 140 of the wireless communication system 100. In operation, the communication manager 105 can be configured to perform a centralized management and optimization of the nodes (e.g., GWs 120, IREs 135, and/or clients 140). In an exemplary aspect, the controller 345 can be configured to perform one or more load measurement and balancing operations based on the measurement information. In this example, the controller 345 can be configured to load balance the clients 140 within the system 100. In an exemplary aspect, the controller 345 can perform frequency allocation operations based on the measurement information to centralize the allocation of frequencies within the system 100. The controller 345 can be configured to determine and assign optimal frequency bands and/or channels to the clients based on the measurement information.

In an exemplary embodiment, the communication manager 105 can improve routing within the system 100 based on the measurement information. For example, the communication manager 105 can improve the selection of the serving communication stations for the clients 140 and control handoffs from one communication station to another, including during movement of the clients 140 from one location to another. In an exemplary aspect, the communication manager 105 can be configured to control the GW(s) 120, IRE(s) 135, and/or client(s) 140 to adjust one or more communication parameters (e.g., serving channel, frequency band, etc.). For example, the communication manger 105 can control the adjustment based on a management packet provided to the GW(s) 120, IRE(s) 135, and/or client(s) 140. In an exemplary aspect, the communication manager 105 can be configured to control the GW(s) 120, IRE(s) 135, and/or client(s) 140 to adjust a routing path between one or more other GW(s) 120, IRE(s) 135, and/or client(s) 140. For example, the communication manager 105 can control an IRE 135 to move from a direct connection with the GW 120 to connecting to the GW 120 via another IRE 135. The routing adjustments can be based on one or more management packets provided from the communication manager 105 to the GW(s) 120, IRE(s) 135, and/or client(s) 140.

The controller 345 can further include a memory 360 that stores data and/or instructions, where when the instructions are executed by the processor circuitry 350, controls the processor circuitry 350 to perform the functions described herein. In an exemplary aspect, the memory 360 can store measurement information obtained from one or more measurement operations, such as a measurement of path loss, received signal strength indicator (RSSI), interference from one or more other networks that share the spectrum, and/or one or more other signal characteristics as would be understood by one of ordinary skill in the art. The memory 360 can include a database configured to store the measurement information. The memory 360 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 360 can be non-removable, removable, or a combination of both.

The operation of the controller 345 and the centralized management and interaction with the GWs 120, IREs 135, and/or clients 140 is described in more detail below with reference to FIG. 4.

Figure 4:
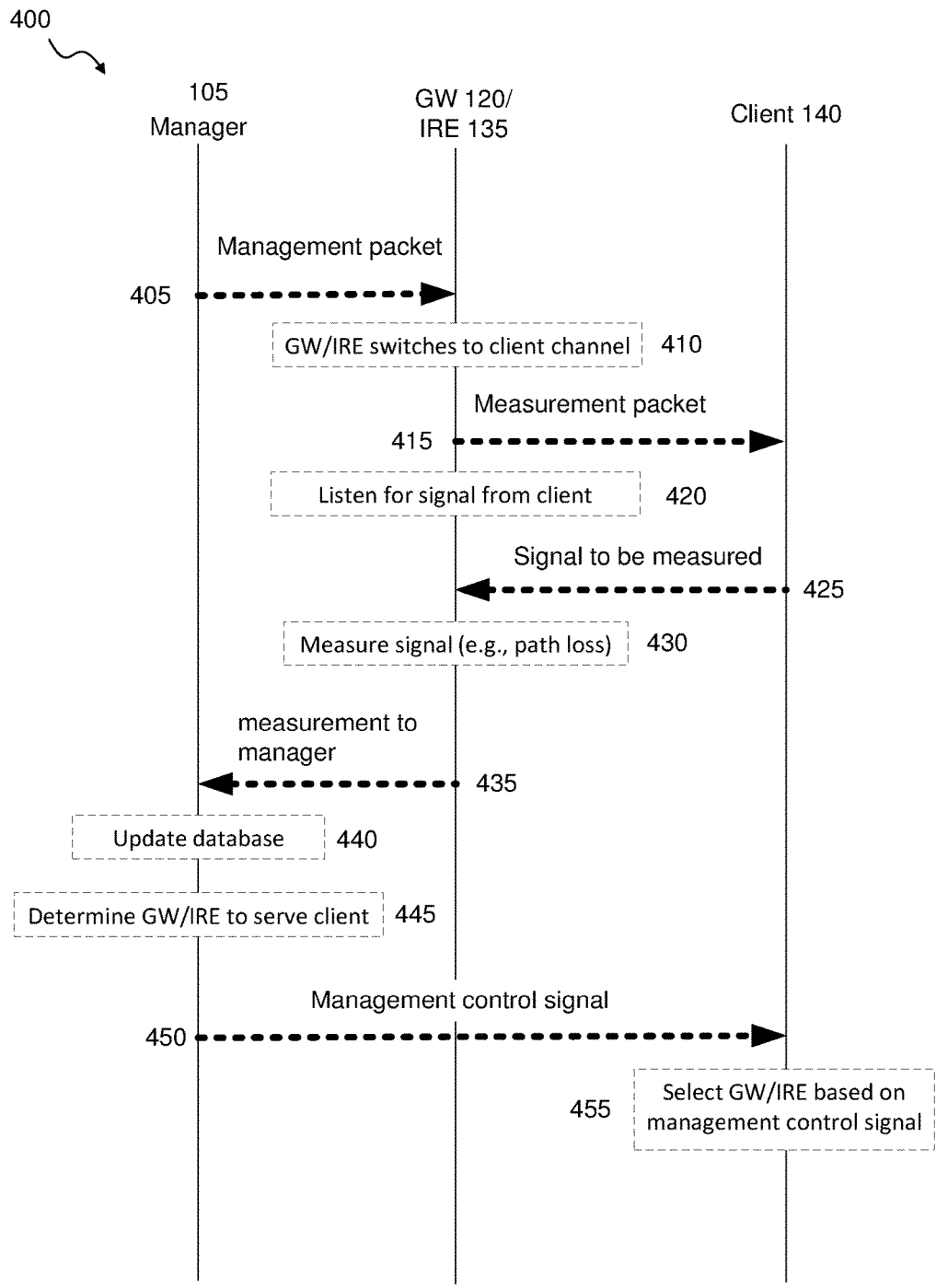
FIG. 4 illustrates a communication management method according to an exemplary aspect of the present disclosure.

With reference to FIG. 4, a flowchart of a communication management method 400 according to an exemplary aspect of the present disclosure is illustrated. The flowchart is described with continued reference to FIGS. 1-3. The steps of the method are not limited to the order described below, and the various steps may be performed in a different order. Further, two or more steps of the method may be performed simultaneously with each other.

In an exemplary aspect, the communication manager 105 is configured to perform one or more communication management operations to obtain measurement information associated with one or more clients 140 of the communication system 100.

The communication manager 105 can be configured to generate one or more management packets (step 405) and can provide the management packet(s) to one or more GWs 120 and/or IREs 135. In an exemplary aspect, based on the management packet(s), the GWs 120 and/or IREs 135 can transmit RTS/CTS frames with the GWs 120 and/or IREs 135 as the destination and having a duration period. The duration period can be defined by the management packet(s).

The management packet(s) can be transmitted via a secure in-band protocol established between the communication manager 105 and the GWs 120 and/or IREs 135. The management packet is configured to control the GWs 120 and/or IREs 135 to switch to an operating channel (step 410) of a client 140 so as to obtain measurement information from the client 140. In an exemplary aspect, the operating channel can be defined by the measurement packet(s).

In response to the management packet, the GWs 120 and/or IREs 135 can be configured to generate a measurement packet based on the management packet. The measurement packet can then be provided to the client 140 of which the measurement information is to be obtained. The GWs 120 and/or IREs 135 can then provide the measurement packet to the client 140 (step 415). The GWs 120 and/or IREs 135 can be configured to listen for the signal from the client 140 on the operating channel of the client 140 (step 420). The time period for listening on the operating channel and/or the operating channel can be defined in the measurement packet(s).

In an exemplary aspect, the GWs 120 and/or IREs 135 can generate and provide the measurement packet to the clients 140 based on a polling time threshold. For example, when the time since a last measurement exceeds the polling time threshold value, the GWs 120 and/or IREs 135 can provide a measurement packet to the client 140 to obtain measurement information (as described below in Step 430). That is, the GWs 120 and/or IREs 135 can initiate a measurement operation based on a polling time threshold and/or in response to a control signal (management packet) from the communication manager 105 or from another communication station operating as a master.

In response to receiving the measurement packet, the client 140 is configured to generate and transmit a signal (step 425) to be measured by the GWs 120 and/or IREs 135. In an exemplary aspect, before the signal is to be transmitted by the client 140, the GWs 120 and/or IREs 135 can be configured to listen for the signal from the client 140 on the operating channel of the client 140 (step 420). In this example, the GWs 120 and/or IREs 135 switch to the operating channel of the client 140 (step 410) so as to be configured to listen for the signal at step 420.

In an exemplary aspect, the GWs 120 and/or IREs 135 are configured to receive the signal from the client 140 and to measure, calculate or otherwise determine one or more signal characteristics of the signal received from the client 140 (step 430). The signal characteristics can include, for example, a path loss measurement, received signal strength indicator (RSSI), bitrate measurements, bandwidth information, basic service set (BSS) load information and/or one or more other signal characteristics as would be understood by one of ordinary skill in the art. In an exemplary aspect, the GWs 120 and/or IREs 135 return to their respective normal operating channel and resume normal operation after the time period for listening and obtaining measurements has expired.

In an exemplary aspect, each of the GWs 120 and/or IREs 135 within range of the client are configured to listen for and determine the signal characteristics of the signal received form the client 140 (step 430). In this example, not only are the GWs 120 and/or IREs 135 that are currently serving the client 140 measuring the signal characteristics of the received signal, but each of the in-range and non-serving GWs 120 and/or IREs 135 are also configured to listen for and measure the signal characteristics of the signal transmitted by the client 140.

In an exemplary aspect, the GWs 120 and/or IREs 135 that have determined signal characteristic(s) of the signal received from the client 140 can provide the measured signal characteristic(s) to the communication manager 105 (step 435). In an exemplary aspect, each of the GWs 120 and/or IREs 135 that have determined signal characteristic(s) of the signal received from the client 140 provides the measured signal characteristic(s) to the communication manager 105. In this example, the communication manager 105 receives measurements of the signal characteristic(s) of the client 140 not only from the GWs 120 and/or IREs 135 that are currently serving the client 140, but also from each of the in-range and non-serving GWs 120 and/or IREs 135.

In response to the received measured signal characteristic(s) from the GWs 120 and/or IREs 135, the communication manager 105 can be configured to collect and process (e.g., analyze) the measured signal characteristics. In an exemplary aspect, the communication manager 105 is configured to maintain a database (e.g., in memory 360 and/or in memory 365) that includes the signal characteristics and/or analysis of the signal characteristics associated with the client 140 (step 440). In an exemplary aspect, the communication manager 105 is configured to repeatedly perform the communication management operations to obtain measurement information associated with the other clients 140 of the communication system 100. In this example, the database can be updated to include signal characteristics and/or analysis of the signal characteristics associated with each of the clients 140 of the communication system 100.

Based on the collective measurement information of the clients 140 of the communication system 100 with respect to the GWs 120 and/or IREs 135, the communication manager 105 can be configured to determine which of the GWs 120 and/or IREs 135 are best suited to serve one or more of the clients 140 (step 445). In an exemplary aspect, the communication manager 105 can be configured to adjust one or more communication system parameters, including, for example, one or more serving frequencies and/or one or more parameters of the clients 140 such as which of the GWs 120 and/or IREs 135 are to serve the clients 140 to optimize communications within the communication system 100.

In an exemplary aspect, based on the determination, the communication manager 105 can generate and provide a management control signal (step 450) to the client 140 to instruct the client 140 which of the GWs 120 and/or IREs 135 the client 140 should establish a connection with. This can be repeated for the other clients 140 (in some cases all of the other clients) of the communication system 100.

The client 140 can then select the appropriate GWs 120 and/or IREs 135 to establish communications with (step 455). In an exemplary aspect, the other clients 140 (in some cases all of the other clients) of the communication system 100 can also select their respective serving GWs 120 and/or IREs 135.

Figure 5:
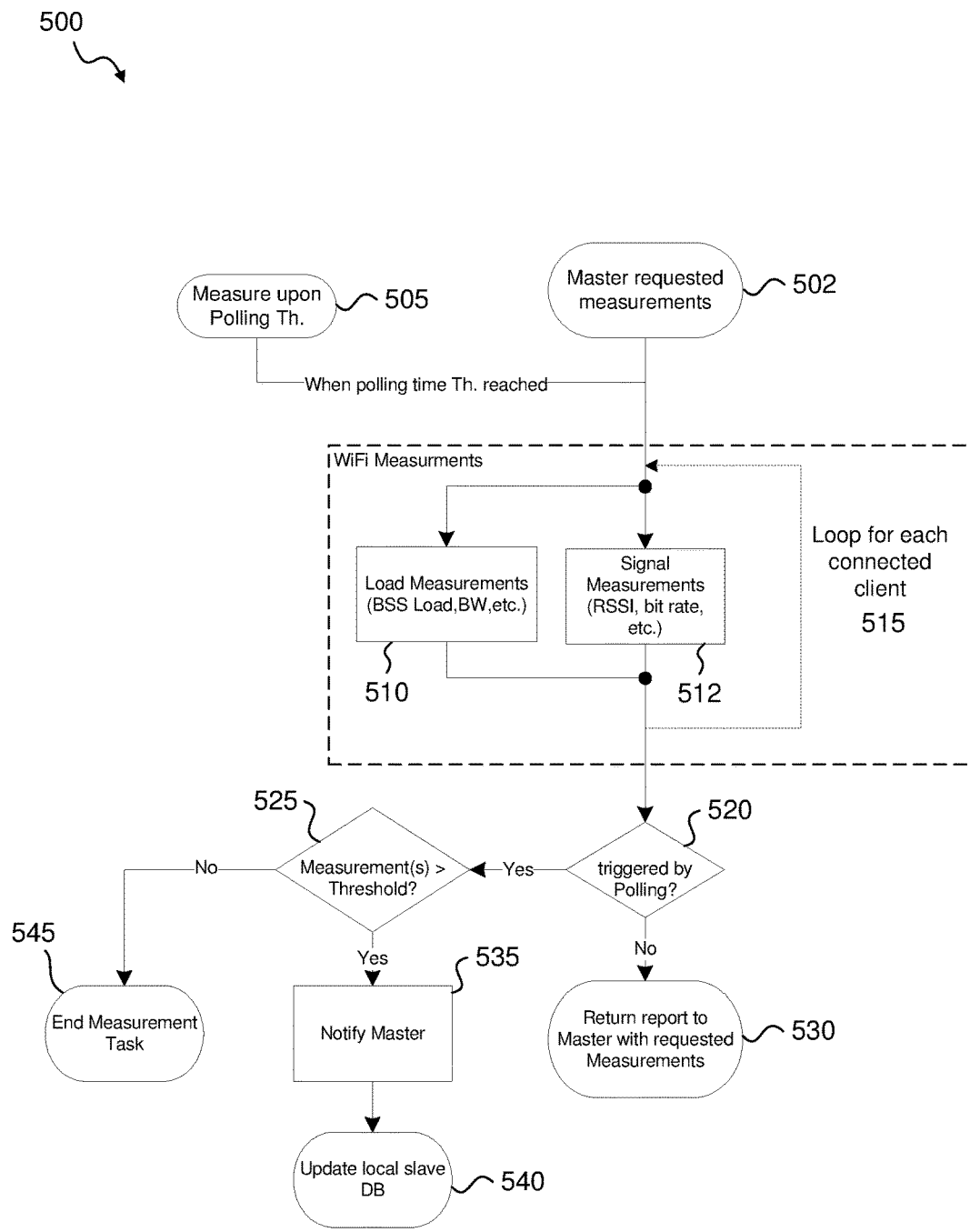
FIG. 5 illustrates a communication management method according to an exemplary aspect of the present disclosure.

Turning to FIG. 5, a flowchart of a communication management method 500 according to an exemplary aspect of the present disclosure is illustrated. The method 500 can be used to processing and update the measurement information managed by the communication manager 105, including updating a database of the measurement information.

The flowchart is described with continued reference to FIGS. 1-4. The steps of the method are not limited to the order described below, and the various steps may be performed in a different order. Further, two or more steps of the method may be performed simultaneously with each other.

In operation, measurements can be initiated in response to a request from a master (Step 502), or by a slave component based on, for example, a polling time threshold (Step 505), change in the channel load and/or change in client received signal strength.

In an exemplary aspect, a slave component (e.g., IRE 135.2 to master GW 120), can generate a measurement packet based on the time since a last measurement and the polling time threshold. If the time since the last measurement exceeds the polling time threshold, the measurement packet can be generated and provided to client 140 to cause the client to generate a signal to be measured by the slave component and/or other GWs 120 and/or IREs 135 within range of the client 140. In an exemplary aspect, the polling time threshold can be, for example, 1 second, but is not limited thereto.

In an exemplary aspect, a master component (such as IRE 135.2 to slave IRE 135.3) can generate and provide a request to the slave component (e.g., IRE 135.3) to instruct the slave component to obtain measurements from the clients 140 it serves.

After steps 502 or 505, the flowchart 500 transitions to steps 510 and/or 512, where measurement information is obtained from the respective clients 140. In step 510, load measurement information is determined, including, for example, bandwidth information, basic service set (BSS) load information, and/or other load measurement information as would be understood by one of ordinary skill in the art. At step 512, signal measurement information is determined, including, for example, bitrate measurements, path loss measurements, received signal strength indicator (RSSI) measurements, and/or one or more other signal characteristic measurements as would be understood by one of ordinary skill in the art. The measurements obtained at Step 510 and/or Step 512 can be repeated for each connected client 140 as illustrated by the feedback path at Step 515.

After the measurements have been completed in steps 510 and/or 512, the flowchart 500 transitions to step 520 where it is determined if the measurements where triggered by polling or if the measurements where a result of a request from a master device.

If the measurement operation was triggered by a request from a master device (NO at step 520), the flowchart 500 transitions to step 530 where the report of the measurement information is provided to the master device, and in some aspects, ultimately to the communication manager 105 (e.g., 435 in FIG. 4).

If the measurement operation was triggered by polling (e.g., time since last measurement exceeds the polling threshold) (YES at step 520), the flowchart 500 transitions to step 525 where the measurement information is compared with one or more measurement threshold values. For example, the measured RSSI value is compared with an RSSI threshold value. If the measured values exceed the corresponding threshold value, the master device is notified (step 535) of the measurement information, and in some aspects, ultimately the communication manager 105 is notified (e.g., 435 in FIG. 4). The slave device receiving the measurement information can then update a local database with the new measurement values (Step 540).

If the measured values do not exceed the corresponding threshold value, the flowchart transitions to step 545 and the flowchart ends (i.e., the master device is not notified).

The method 500 can be repeated for one or more subsequent polling and/or master requests.

EXAMPLES

Example 1 is an apparatus of a communication network management system, the apparatus comprising: a transceiver configured to communicate with communication stations and one or more clients of the communication network; and a controller configured to: generate a management packet and control the transceiver to provide the management packet to the communication stations to instruct the communication stations to measure a communication from the client; obtain respective measurements from the communication stations; and control the client of the one or more clients to select a communication station from the communication stations to serve the client based on the respective measurements.

In Example 2, the subject matter of Example 1, wherein the management packet instructs the communication stations to monitor for the communication from the client so as to measure the communication from the client.

In Example 3, the subject matter of Example 1, wherein the management packet instructs the communication stations to generate respective measurement packets and provide the respective measurement packets to the client, the client transmitting the communication based on the measurement packet.

In Example 4, the subject matter of Example 1, wherein management packet instructs the communication stations to operate on a channel used by the client to monitor the communication from the client.

In Example 5, the subject matter of Example 1, further comprising a memory that stores the obtained respective measurements of the communication stations.

In Example 6, the subject matter of Example 1, wherein the measurements from the communication stations comprise a path loss between the client and each of the respective communication stations.

In Example 7, the subject matter of Example 1, wherein the transceiver is configured to communicate with the communication stations and the one or more clients via one of more Institute of Electrical and Electronics Engineers' (IEEE) 802.11 standards.

In Example 8, the subject matter of Example 2, wherein the controller is configured to control each of the communication stations to monitor the communication from the client.

In Example 9, the subject matter of Example 8, wherein the communication stations comprise a serving communication station actively serving the client and at least one other non-serving communication station within range of the client.

In Example 10, the subject matter of Example 1, wherein one of the apparatus is implemented in one of the communication stations.

Example 11 is a method adapted for communication network management of a communication network comprising communication stations and one or more clients, the method comprising: controlling the communication stations to monitor a communication from the client of the one or more clients and measure the client communication; obtaining respective measurements from the communication stations; and controlling the client of the one or more clients to select a communication station from the communication stations to serve the client based on the respective measurements.

In Example 12, the subject matter of Example 11, wherein the controlling the communication stations is based on a management packet generated by a communication manager of the communication network.

In Example 13, the subject matter of Example 12, wherein the client generates the communication in response to a measurement packet received from the communication station, the measurement packet being generated by the communication station based on the management packet.

In Example 14, the subject matter of Example 11, wherein monitoring the communication comprises switching to a channel being used by the client to communicate.

In Example 15, the subject matter of Example 11, further comprising storing the obtained respective measurements of the communication stations.

In Example 16, the subject matter of Example 11, wherein the measurements from the communication stations comprise a path loss between the client and each of the respective communication stations.

In Example 17, the subject matter of Example 11, wherein the controlling the communication stations comprises controlling each of the communication stations to monitor the communication from the client.

In Example 18, the subject matter of Example 17, wherein the communication stations comprise a serving communication station actively serving the client and at least one other non-serving communication station within range of the client.

In Example 19, the subject matter of Example 12, wherein one of the communication stations of the communication network comprises a communication manager, and wherein the controlling the communication stations is based on one or more management packets generated by the communication manager and provided to another of the communication stations.

In Example 20, the subject matter of Example 11, further comprising: controlling the communication stations and/or the one or more clients to adjust one or more communication parameters.

In Example 21, the subject matter of Example 11, further comprising: controlling the communication stations and/or the one or more clients to adjust one or more routing paths within the communication network.

Example 22 is a communication manager comprising a controller configured to perform the method of claim 11.

Example 23 is a communication management method of a communication network including communication stations and one or clients, comprising: monitoring a communication from the client of the one or more clients based on a management packet received from a communication manager; generating and providing a measurement packet to the client of the one or more clients based on the management packet; calculating, by a communication station of the communication stations, measurements between the client and the communication station based on the measurement packet; and providing, by the communication station, the respective calculated measurements to the communication manager.

In Example 24, the subject matter of Example 23, wherein the client is configured to select a communication station from the communication stations to serve the client in response to control signal generated based on the respective calculated measurements.

In Example 25, the subject matter of Example 23, wherein the communication manager is configured to generate the control signal based on the respective calculated measurements and provide the control signal to the client.

Example 27 is a computer program product embodied on a computer-readable medium comprising program instructions, when executed, causes a processor to perform the method of any of claims 11-25.

Example 28 is an apparatus substantially as shown and described.

Example 29 is a method substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc.

Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to IEEE 802.11 wireless communications and can be applied to other non-cellular or cellular (e.g., LTE) communication protocols as would be understood by one of ordinary skill in the relevant arts. Further, exemplary aspects are not limited to wireless networks and can be used or implemented in one or more wired networks using one or more well-known wired specifications and/or protocols.

What is claimed is:

1. A communication manager configured to manage a communication network, the communication manager comprising:
    a transceiver configured to:
        communicate with the communication network that includes a wide-area network coupled to (i) communication stations, and (ii) one or more clients of the communication network;
        transmit a management packet to the communication stations, the management packet being transmitted from the transceiver to each of the communication stations being served by the communication manager, the management packet instructing each of the communication stations to concurrently determine one or more network condition measurements using a first signal transmitted from one or more clients within wireless range of the communication stations; and
    a controller configured to obtain, upon the communication stations determining the one or more network condition measurements using the first signal, the one or more network condition measurements using a second signal that is received upon being transmitted from each of the communication stations that is indicative of the one or more network condition measurements obtained using the first signal,
    wherein the transceiver is further configured to transmit a management control signal to at least one of the one or more clients, the management control signal instructing the at least one of the one or more clients to select, based on the one or more network condition measurements, a communication station from the communication stations to serve the at least one of the one or more clients.

2. The communication manager of claim 1, wherein the management packet instructs the communication stations to generate respective measurement packets and to transmit the respective measurement packets to the one or more clients, the one or more clients transmitting the first signal to the communication stations based on the measurement packet.

3. The communication manager of claim 1, wherein the management packet instructs the communication stations to operate on a channel used by the one or more clients to monitor the first signal received from the one or more clients.

4. The communication manager of claim 3, wherein the controller is configured to control each of the communication stations to monitor the communication from the one or more clients.

5. The communication manager of claim 4, wherein the communication stations comprise a serving communication station actively serving the one or more clients and at least one other non-serving communication station within range of the one or more clients.

6. The communication manager of claim 1, further comprising a memory that stores the obtained one or more network condition measurements from the communication stations.

7. The communication manager of claim 1, wherein the one or more network condition measurements include a path loss measurement between the one or more clients and each of the respective communication stations.

8. The communication manager of claim 1, wherein the transceiver is configured to communicate with the communication stations and the one or more clients via one of more Institute of Electrical and Electronics Engineers' (IEEE) 802.11 standards.

9. The communication manager of claim 1, wherein the communication manager is implemented in one of the communication stations.

10. The communication manager of claim 1, wherein the network condition measurements include load measurements, and
    wherein the load measurements include at least one of bandwidth information and basic service set (BSS) service information.

11. The communication manager of claim 1, wherein the one or more network condition measurements include bitrate measurements.

12. The communication manager of claim 1, wherein each of the communication stations, upon receiving the management packet from the communication manager, concurrently switch to a listen only mode to concurrently measure one or more network condition measurements associated with the signal transmitted from each client served by each respective communication station.

13. The communication manager of claim 12, wherein upon receiving the management packet from the communication manager, each of the communication stations concurrently switch to the listen only mode by switching to an operating channel that matches that of the signal transmitted from each client served by each respective communication station.

14. The communication manager of claim 1, wherein the one or more network condition measurements include one or more of:
    a path loss measurement;
    a received signal strength indicator (RSSI) measurement;
    a bitrate measurement,
    a bandwidth measurement; and
    a basic service set (BSS) load measurement.

15. A method adapted for communication network management of a communication network that includes a wide-area network coupled to communication stations and one or more clients, the method comprising:
- generating one or more management packets;
- transmitting the one or more management packets to respective communication stations of the communication network, the management packet being transmitted from a communication manager to each of the communication stations being served by the communication manager, the management packet instructing the communication stations to concurrently determine one or more network condition measurements using a signal transmitted from each of the one or more clients within wireless range of the communication stations;
- obtaining the one or more network condition measurements from the communication stations upon the communication stations determining the one or more network condition measurements using the signal; and
- transmitting a management control signal to at least one of the one or more clients, the management control signal instructing the at least one of the one or more clients to select, based on the one or more network condition measurements, a communication station from the communication stations to serve the at least one of the one or more clients.

16. The method of claim 15, wherein each of the one or more clients generates the signals in response to a measurement packet received from the communication stations, the measurement packet being generated by the communication stations based on the management packet.

17. The method of claim 15, wherein measuring the one or more network condition measurements comprises the communication stations switching to a channel being used by the one or more clients to communicate with the one or more clients.

18. The method of claim 15, further comprising storing the obtained one or more network condition measurements of the communication stations.

19. The method of claim 15, wherein the one or more network condition measurements from the communication stations comprise a path loss between the one or more clients and each of the respective communication stations.

20. The method of claim 15, wherein the communication stations comprise a serving communication station actively serving the one or more clients and at least one other non-serving communication station within range of the one or more clients.

21. The method of claim 15, wherein one of the communication stations of the communication network comprises a communication manager, and wherein the act of generating and transmitting the one or more management packets is performed by the communication manager and provided to other ones of the communication stations.

22. The method of claim 15, further comprising:
instructing one or more of the communication stations and the one or more clients to adjust one or more communication parameters.

23. The method of claim 15, further comprising:
instructing one or more of the communication stations and the one or more clients to adjust one or more routing paths within the communication network by adjusting the connections between the communication stations and the one or more clients of the communication network coupled to the wide-area network.

24. A communication management method of a communication network that includes a wide-area network coupled to communication stations and one or more clients, comprising:
- receiving, by each of the communication stations of the communication network, a management packet transmitted from a communication manager, the management packet being transmitted to each of the communication stations being served by the communication manager;
- concurrently generating and transmitting, by each of the communication stations, a measurement packet to a client from the one or more clients that is within wireless range based on the received management packets;
- concurrently calculating, by each of the communication station, one or more network condition measurements associated with a first signal transmitted from the client to each of the communication stations based on the measurement packets;
- transmitting, by the communication station, the one or more network condition measurements to the communication manager as part of a second signal; and
- selecting, by the client, a communication station from the communication stations to serve the client in response to instructions received from the communication manager, the instructions being transmitted by the communication manager based on the one or more network condition measurements.

25. The communication management method of claim 24, wherein the selecting of the communication station to serve the client is in response to a control signal generated received by the client based on the one or more calculated network condition measurements.

26. The communication management method of claim 25, wherein the control signal is generated and transmitted by the communication manager.

* * * * *